Jan. 5, 1937.   J. G. JONES   2,066,568
EXPANSIBLE FILM HUB
Filed Jan. 26, 1934

Inventor:
John G. Jones,
By
Attorneys

Patented Jan. 5, 1937

2,066,568

UNITED STATES PATENT OFFICE 2,066,568

EXPANSIBLE FILM HUB

John G. Jones, Rochester, N. Y., assignor, by mesne assignments, to Eastman Kodak Company, Jersey City, N. J., a corporation of New Jersey Application January 26, 1934, Serial No. 708,470

6 Claims. (Cl. 242—72)

This invention relates to hubs to be used for winding and reeling and particularly to expansible hubs with slots in which the end of the strip material to be wound upon the hub can be engaged and locked. One object of my invention is to provide an expansible hub on which convolutions of strip material, such as motion picture film, can be wound and from which the convolutions can be removed by retracting the hub. Another object of my invention is to provide an expansible hub member with a slot for receiving the end of the strip material and to provide means for simultaneously retracting the hub and opening the slot to release the end of the strip material wound thereon so that it may be removed from the hub. Another object of my invention is to provide an expansible hub with a slot so proportioned that when the end of strip material is tightly engaged in the slot, the periphery of the hub will be substantially cylindrical so that convolutions of strip material can be wound over the expansible hub and the end of the film engaged in the slot without creasing or bending. Another object of my invention is to provide an expansible hub with a means for simultaneously increasing the diameter of the hub and closing the slot to engage the end of the strip material. Still another object of my invention is to provide an expansible hub which is resilient enough to be sprung to and from an expanded position and which is also rigid enough to prevent a small area of the expansible hub from becoming deformed. Other objects will appear from the following specification, the novel features being particularly pointed out in the claims at the end thereof.

In winding some types of strip material, such as motion picture film, it is desirable to have a hub which is substantially cylindrical in shape and which is comparatively rigid so that convolutions of strip material will assume a true circular form.

With photographically sensitive material, such as motion picture film, which is extremely susceptible to abrasion and friction marks, it is desirable to have a hub which may engage and hold an end of the film after which convolutions can be wound on the hub without an off-set being formed in the convolutions of film at that point where the film winds over the closed slot holding the end of the film. Great care must be taken, particularly with the high speed panchromatic and super-sensitive emulsion coated film, to prevent the film from being unduly creased or bent about a sharp angle because otherwise it frequently happens that a bend or crease may make friction or pressure marks in the sensitized emulsion which will show throughout a large number of convolutions.

In my present invention, therefore, I have provided an expansible hub with a slot for receiving the end of the film so arranged that when a film is tightly held in this slot, one side of the expansible hub will be of shorter radius of curvature than the other side by a length substantially equal to the thickness of a motion picture film. Consequently when the first complete convolution is wound about such a hub the film winds perfectly smoothly from the high side of the expansible hub to the top of the motion picture film held by the slot and first wound over the low side of the expansible hub. In this way the film passing over the slot passes through a perfectly smooth arc and there is no possibility of the edges of the slot which holds the film end off-setting in the form of lines or pressure marks on the motion picture film.

As a preferred form of my invention, the expansible hub shown in the drawing is illustrated as embodying my invention.

Coming now to the drawing wherein like reference characters denote like parts throughout:

Figure 1:
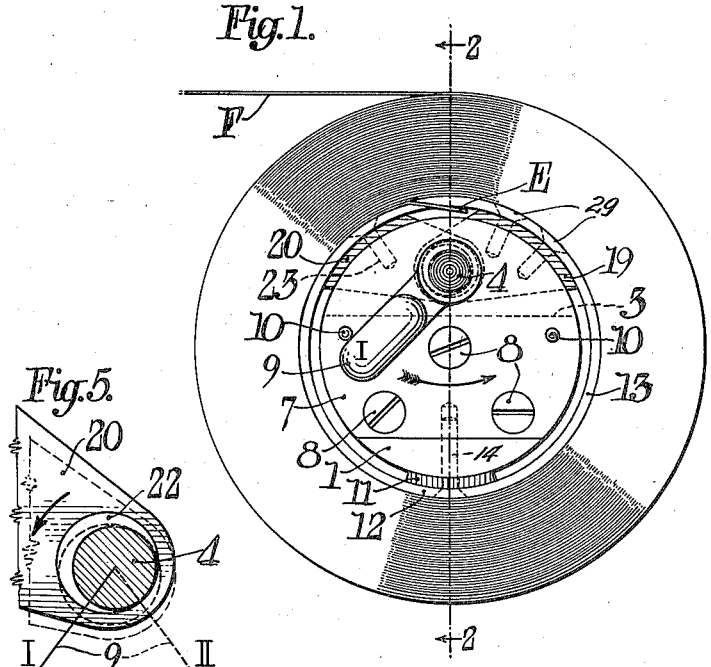
Fig. 1 is a side elevation of a motion picture film winding device employing a hub constructed in accordance with and embodying a preferred form of my invention with a number of convolutions of film smoothly wound thereon.

The hub shown in Fig. 1 may consist of a supporting member 1 which may be of any desired shape, but which is preferably made substantially circular in cross-section. This base member is preferably provided with a threaded portion 2 by which it may be supported on any suitable winding shaft threaded to engage the thread 2. The support member 1 is provided with a cutout or recess 3 to form an opening for a cam shaft 4. This cam shaft may be supported in one bearing 5 formed in the support and in a second bearing 6 which can be conveniently made of a plate 7 fastened to the support by means of a series of screws 8.

The cam shaft 4 is provided with a handle 9 by which it may be turned, and there is preferably a pair of stop pins 10 carried by the plate 7 which serves to limit the movement of the handle 9 in both directions.

At the bottom (looking at Fig. 1) the support 1 is provided with an arcuately-shaped plate 11 which in turn supports a small portion 12 of an expansible hub 13. The plate 11 and the portion 12 of the expansible hub 13 may be affixed to the support 1 by means of a pair of screws 14.

Figure 3:
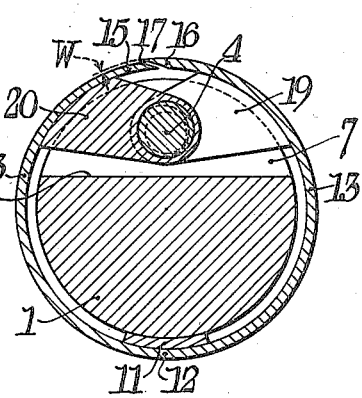
Fig. 3 is a transverse section of the hub shown in Fig. 2 on line 3—3 thereof.

The expansible hub 13 is preferably made of spring material, such as steel, bronze, or brass, and is of substantial thickness so that it will firmly hold its cylindrical shape. However, the ends of the expansible hub 13, that is, the ends 15 and 16 between which there is normally a slot 17, may be made of a slightly different thickness of material, as shown in Fig. 3, so that when in a normal expanded position in which the slot 17 is open only a sufficient distance to pinch the end of a film, the end 16 will lie axially off-set from the end 15 by a distance W shown in Fig. 3 which is the thickness of a normal motion picture film. Thus when the end E of the film F is caught in the slot 17, as shown in Fig. 1, the periphery of the expansible hub 13 just meets with the upper side of a film held in the slot, so that as successive convolutions of film are wound upon the expansible hub, the arc through which these convolutions pass is a perfectly smooth one and the film is not creased or bent as it passes over the edges of the slot 17 as is customary with the usual type film winding device.

In order to expand and contract the expansible hub 13, the ends 15 and 16 are connected by the arms 19 and 20 to cams 21 and 22 which are affixed to or which may form a part of the cam shaft 4. The end 15 is connected to arm 20 by screws 23. The arm 19 is connected to end 16 by screws 29 although obviously any other fastening means such as rivets or welding may be used if desired. I prefer to provide two arms 19 and two cams 21 so that an arm and cam may be positioned on each side of arm 20 and cam 22.

Figure 5:
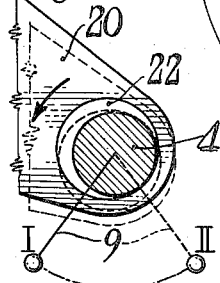
Fig. 5 is an enlarged fragmentary detail side elevation schematically showing the relation of one of the cams to one end of the expansible hub.
Figure 4:
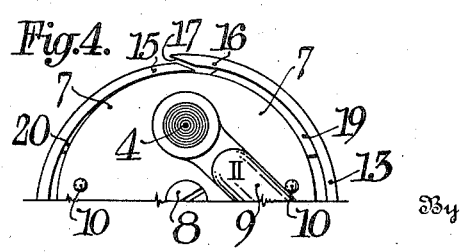
Fig. 4 is a fragmentary side elevation of the hub shown in Fig. 1 but with the parts in a retracted position.

The shape of these cams is different. Referring to Fig. 5, the cam 22 is so shaped that by swinging the handle 9 from the position diagrammatically illustrated at I to the position diagrammatically illustrated at II, the cam is swung from the full-line position to the dotted-line position. During this movement, the arm 20 causes the end 15 (see Fig. 4) to move downwardly until it may be substantially in contact with the bearing plate 7.

Figure 6:
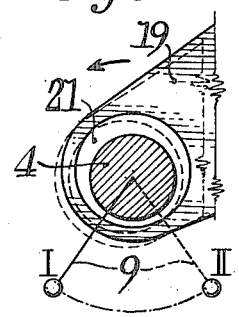
Fig. 6 is a view similar to Fig. 5, but of the oppositely acting cam member.
Figure 2:
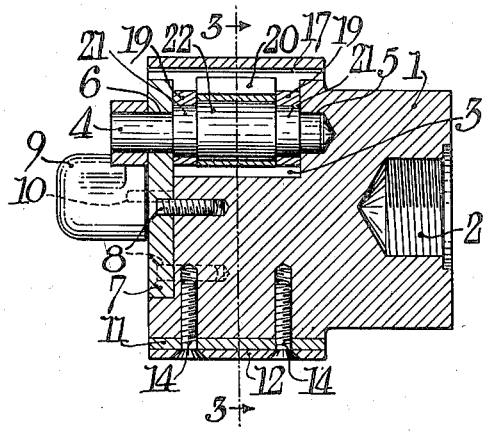
Fig. 2 is a section of the hub shown in Fig. 1 being taken on line 2—2 of Fig. 1.

As the shaft 4 moves to turn cam 22, it will likewise turn cam 21 and as cam 21 moves from the full-line position of Fig. 6 to the broken-line position in this figure, the arm 19 will spring the end 16 of the expansible hub 13 in the direction shown by the arrow in Fig. 6, that is, it will move it toward the end 15 but will not retract it toward the support more than a small fraction of an inch; whereas in the case of the cam 22, the movement is in the direction shown by the arrow in Fig. 5 and the end 15 is retracted considerably more than the end 16. The reason for this is that while it is necessary to retract the core until the outside diameter of the member 13 is less than when in its expanded position, it is also desirable that the slot 17 between the ends 15 and 16 which remain open so that the end E of a film may be freely inserted or removed. This must be true even when the expansible hub 13 is in its most retracted position.

The spring material of which the expansible hub 13 is made is of an appreciable thickness and is fairly rigid so that it will definitely hold its shape against the pressure of the winding operation. It may be sprung, however, by means of the cams and arms structures above described which, of course, are arranged so that the lever 9 through the cams 21 and 22 and the arms 19 and 20 has a material mechanical advantage.

The operation of the winding core shown in the drawing may be as follows:

Assuming that convolutions of film F have been wound on the core and it is desirable to remove these convolutions to another support, the handle 9 may be swung in a counter-clockwise direction as shown by the arrow in Fig. 1. This rotates the cam shaft 4 and with it the cams 20 and 21 moving the arms 19 and 20 and retracting the expansible hub member 13 in the manner above described. This reduces the diameter of the expansible hub and at the same time opens the slot 17, releasing the film end E. The film convolutions may then be moved axially from the hub.

In order to wind a fresh coil of film on the hub, the end of the film E is inserted in the slot 17 and the handle 9 is swung in a clockwise direction until the film end E is firmly gripped between the edges 15 and 16. As above described, this pinches the end of the film and since the proportion of the parts is properly arranged, the arc of the wall 16 is substantially continuous with the arc of the upper side of the film passing from the slot 17 so that as convolutions of film are wound on the expansible hub, perfectly smooth, even winding will result.

An important feature of my invention is the arrangement of the ends 15 and 16 and the slot 17, since it is important to prevent any ridge or line at all over that portion of the film which has been wound over the slot holding the end of the film. It is also desirable to have the film end E pass from the slot at such an angle that the bend in the film as it is passed around the periphery of the expansible member 13 is at a comparatively slight angle because where the film is brought out and bent at say 90°, it is impossible to wind over a second convolution of film, particularly when the film is wound under considerable tension without having an off-set line occur where the second film convolution strikes the sharply bent first film convolution. As will be noted from Fig. 1, the slot 17 does not extend laterally of the expansible hub 13, but to the contrary is almost tangentially arranged with respect to the inside diameter of the expansible hub. Thus, the bend at the point where the film passes out of the slot and starts to pass around the periphery of the expansible hub need only be a comparatively slight one. However, when the film passes out at a relatively small angle, as shown in Fig. 1, I have found that on the first convolution of film wound on the expansible member, it is impossible to detect any line or crease when the parts are properly constructed. I have thus entirely eliminated the friction marks which sometimes will show in as many as 15 or 20 convolutions each time the film passes over the film holding slot.

While I have described a preferred embodiment of my invention, it is obvious that various changes can be made without departing from my invention and I contemplate as within the scope of my invention all such changes as may come within the scope of the appended claims.

What I claim is:

1. In an expansible core for motion picture film, the combination with a supporting member, of an expansible hub affixed to said supporting member and comprising a split ring, said ring being substantially circular in cross section, but having one side of the split portion higher than the other in an amount equal to the thickness of a motion picture film, whereby convolutions of film may wind smoothly over an end of the film held in said split portion of the ring, means for expanding and contracting said split ring operably connected to the ring and supporting member, and a handle carried by the supporting member for actuating said means.

2. In an expansible core for motion picture film, the combination with a supporting member, of an expansible hub affixed to said supporting member and comprising a split ring, said ring being substantially circular in cross section, but having one side of the split portion higher than the other in an amount equal to the thickness of a motion picture film, whereby convolutions of film may wind smoothly over an end of the film held by the split portion of the ring, the said expansible hub being of substantial thickness, the inner diameter being materially less than the outer diameter thereof, and the edges of the split ring extending from the outer diameter to the inner diameter and being substantially tangentially arranged with respect to the inner diameter of the expansible hub, and means connecting parts of the expansible hub and the supporting member for moving the former from the latter.

3. In an expansible core for coils of motion picture film, the combination with a support, of a small arcuate projection carried by said support, a slotted expansible resilient metal hub carried by the arcuate projection and having a small arc of contact therewith and spaced from the remainder of the support, a cam shaft carried by the support, cams mounted on the shaft, arms connecting the ends of the slotted resilient expansible hub and the cam shaft for moving the expansible hub by flexing the resilient metal over that area of the hub which lies out of contact with the small arcuate projection carried by the support by means of the cams to expand and contract the hub, said cams being so shaped as to contract the resilient expansible member and simultaneously retain the slot between the ends of the expansible member in an open position, whereby a smooth film contacting surface is maintained on the hub irrespective of its position.

4. In an expansible core for coils of motion picture film, the combination with a supporting member, of a small arcuate projection on the supporting member, a flexible and expansible hub surrounding said supporting member and contacting with only the small arcuate projection thereon, and having a pair of spaced ends adapted to form a slot opposite the small arc of contact between the expansible hub and supporting member, means for holding the flexible and expansible member attached to the support intermediate the ends of the expansible member, cam means carried by the supporting member and adapted to act on the free ends of the flexible and expansible member for altering the width of the slot between the ends thereof and altering the shape of the expansible member throughout substantially its entire periphery, said cam means being so shaped that the periphery of the expansible member is reduced in size as the slot is opened up.

5. In an expansible core for coils of motion picture film, the combination with a supporting member, of a small arcuate projection on the supporting member, an expansible hub surrounding said supporting member and having contact with only the small arcuate projection thereon, said expansible hub including a one piece annular flexible member having a smooth outside periphery and ends lying close to each other and spaced from the small arc of contacting area of the expansible hub and supporting member whereby a slot exists between the ends, means for holding the hub to the support, a cam shaft with cams carried by the support and adapted to be operatively engaged with the ends of the expansible hub member to flex the annular member throughout all that portion of its periphery which is spaced from the supporting member, and means for operating the shaft.

6. In an expansible core for motion picture film, the combination with a supporting member, of a small arcuate projection thereon, an expansible hub affixed to the small arcuate projection of said supporting member with the major portion of the expansible hub spaced therefrom, and comprising a resilient split metal ring, arms attached to the inside of the ring to each side of the split therein, cam means for operating said arms, and a handle carried by the support for actuating the cams, whereby the ends of the resilient split ring may be flexed relative to each other for altering the size and shape of the resilient split ring throughout substantially its entire periphery except for that part having a small arcuate contact with the arcuate projection of the support for controlling the width of the slot in the split ring.

JOHN G. JONES.